(No Model.) 2 Sheets—Sheet 1.
F. O. WEARY & G. W. KRAMER.
BOLT FOR PRISON DOORS.
No. 478,146. Patented July 5, 1892.
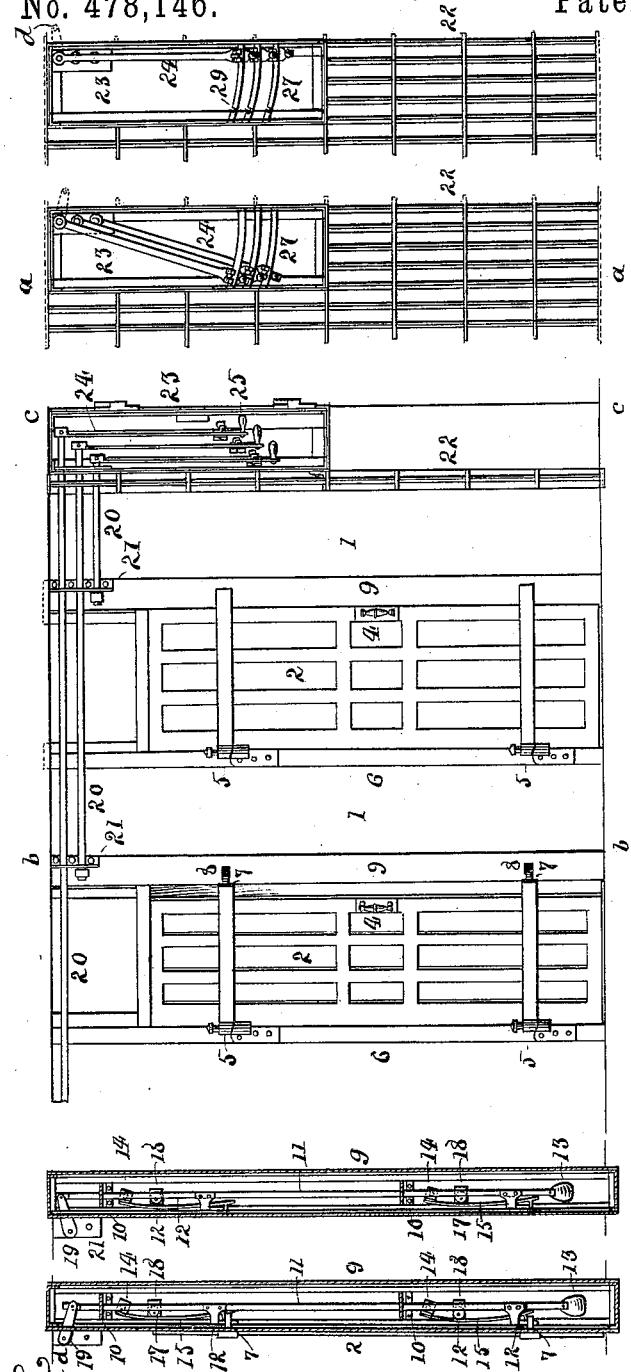
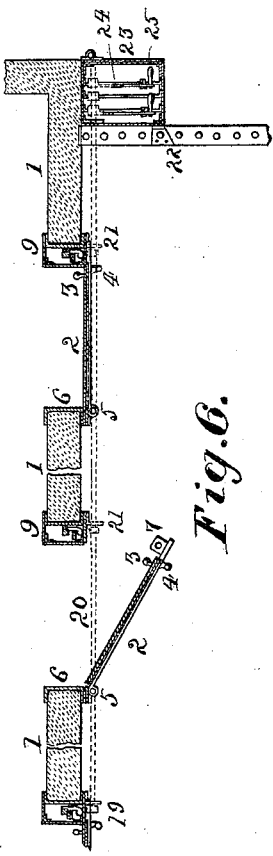
Witnesses
Inventors
Frank O. Weary
George W. Kramer (No Model.) 2 Sheets—Sheet 2.
F. O. WEARY & G. W. KRAMER.
BOLT FOR PRISON DOORS.
No. 478,146. Patented July 5, 1892.
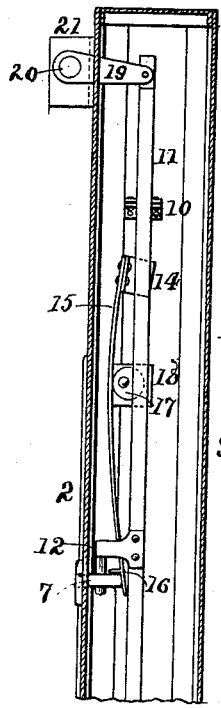
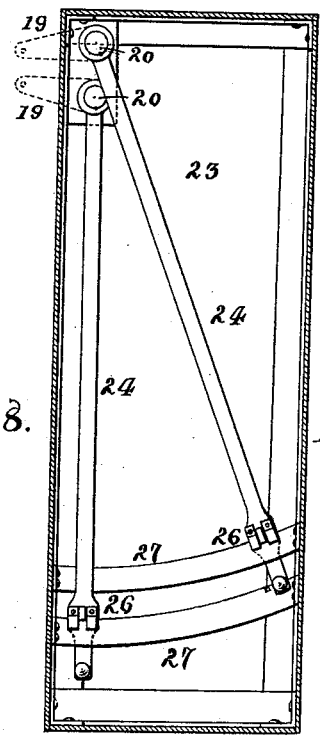
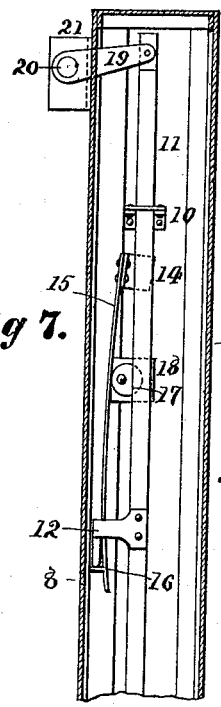
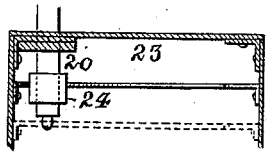
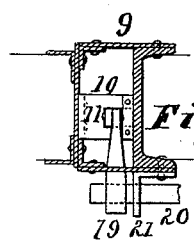
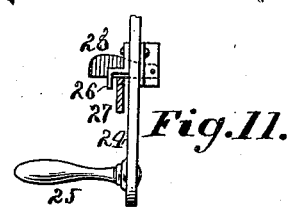
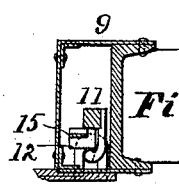
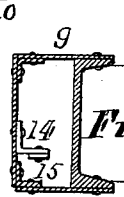
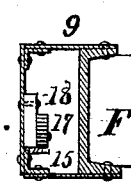
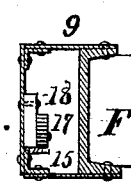
Witnesses
Inventors
Frank O. Weary
Geo. W. Kramer

UNITED STATES PATENT OFFICE.

FRANK O. WEARY AND GEORGE W. KRAMER, OF ARKON, OHIO.

BOLT FOR PRISON-DOORS.

SPECIFICATION forming part of Letters Patent No. 478,146, dated July 5, 1892.

Application filed October 5, 1891. Serial No. 407,715. (No model.)

*To all whom it may concern:*

Be it known that we, FRANK O. WEARY and GEORGE W. KRAMER, citizens of the United States, residing at Akron, in the county of Summit and State of Ohio, have invented a certain new and useful Improvement in Locking Apparatus for Prison-Cells, of which the following is a specification.

Our invention has relation to improvements in that class of locking devices for prison-cells wherein the cells can be severally locked and unlocked by devices located outside of the prison area through mechanism connecting them with the locking-bolts of the cells; and it has for its object to provide an independent automatic locking device for each cell that may be operated from outside the prison area, but shall be inoperative from within the area or cell; to provide devices for forcing the cell-door partially open when the locking-bolts are withdrawn and simultaneously retaining the bolts withdrawn until the door is completely closed; to provide an adjusting apparatus to regulate the last-named device, and, generally, to provide a simple and effective locking system that shall automatically operate on each cell when the door is closed, be manipulated from without the prison area, and shall indicate at the manipulating mechanism when the cell-door is locked, and thereby insure each door being completely closed and locked.

To the aforesaid object our invention consists in the peculiar and novel construction, arrangement, and combination of parts hereinafter described, and then specifically pointed out in the claims, reference being had to the accompanying drawings, forming a part of this specification.

In the accompanying drawings, in Sheet 1 of which the designating-numbers of the different figures are placed beneath and in Sheet 2 at the right of the figures and in all of which similar reference-numerals indicate like parts in the several views, Figure 1 is an elevation of two prison-cells with the area-grating and lock-lever box in vertical section at the line *a a* of Fig. 4. Figs. 2 and 3 are vertical sections and outer hollow jambs which contain the locking mechanism at the line *b b* of Fig. 1, showing the locking-bolt lowered and raised, as hereinafter explained. Figs. 4 and 5 are elevations of portions of the area-gratings with the lock-lever box in section at the lines *c c* of Fig. 1, showing the position of the lock-lever when the locking-bolts are lowered and raised, respectively. Fig. 6 is a horizontal section of Figs. 1, 2, 3, 4, and 5 at the line *d d*. Fig. 7 is an enlarged sectional view of the lock-lever box similar to those shown in Figs. 4 and 5, looking from the opposite direction and showing the relative positions of two locking-levers where one cell is locked and the other unlocked; Figs. 8 and 9, an enlarged view of the upper portions of the hollow jambs shown in Figs. 2 and 3, respectively. Fig. 10 is a horizontal section, enlarged, of part of the lock-lever bar, the upper part toward the cells and at the line *e e* of Fig. 7. Figs. 11 and 12 are side and top views, enlarged, of portions of the locking-levers and handles with adjacent connected parts; Figs. 13, 14, 15, and 16, enlarged horizontal sections of the hollow jamb at the lines *f f*, *g g*, *h h*, and *i i*, respectively; and Fig. 17, an enlarged horizontal section of the cell-door hinge and post, showing their construction.

Referring to the drawings, 1 represents a portion of the cell-walls, which may be grated or tight, as shown, and of any desired or approved material, and in which, in the doorway of each cell, is suspended a door 2, having inner and outer handles 3 4 and hinges 5, extending from a metallic post 6, the upper and lower members of which hinges have corresponding contiguous spiral faces, so that as the door is opened it will rise vertically and consequently will swing by gravitation to close itself when released. On the opposite end of each hinge-strap of the door 2 is an eye 7, arranged to enter corresponding openings 8 in the hollow jamb-post 9, hereinafter described, to receive the locking-bolts. The jamb-post 9 consists of a hollow metallic tube of steel or other approved or desired material, the only openings in which are those 8 for the reception of the eyes 7, hereinbefore referred to, and an upper one for the bolt-lifting arm hereinafter described. Inside of this post and sliding in suitable guides 10 is a vertical bar 11, carrying two offset downwardly-projecting bolts 12, arranged to enter the eyes 7 when the door is completely closed and provided with weights 13 to insure their descent in locking the door, which weights are preferably made adjustable and may be omitted if the bar and bolts are sufficiently heavy to successfully operate without them. At one of the inner sides of the post 9 are brackets 14, to which are secured the upper ends of springs 15, near the lower ends of which and with their lower faces in substantially the plane of the tops of the openings 8 are outwardly-projecting toes 16, arranged to press against the inner front wall of the post 9 and rest beneath and sustain the bolts 12 when the latter are raised and the door opened. The lower ends of the springs 15 below the toes 16 are arranged to be engaged and pressed back by the eyes 7 as the door is closed, thereby withdrawing the toes 16 from beneath the bolts 12 and permitting the latter to fall, and they subserve the further purpose of pushing the door partly open as soon as the bolts are withdrawn. The tension of this spring is adjusted by a cam 17, mounted on a block 18 on one of the inners walls of the post 9.

It has not been attempted to place reference-numerals to all these parts in the figures on Sheet 1, as from the scale of the drawings they would tend to confusion, but to place so many as to indicate their relative position, the details being supplied in the enlarged figures of Sheet 2.

The parts thus far described are all adjusted before being sent from the factory as to the meeting of the bolts and eyes, the vertical movement of the bolt-carrying bar, and its adjustable weight and the tension of the spring, and are thus inaccessible to being changed or tampered with.

Pivotally connected to the upper end of each bolt-carrying bar 11 is a crank-arm 19, which projects through a slot in the post 9, and has at its outer end an opening to receive a shaft 20, to which it is keyed, or, if preferred, fastened by a set-screw, which shaft, supported in suitable bearings 21, passes through the area-grating 22 into the lock-lever box 23, where it is keyed or otherwise fastened to a depending rocking lever 24, provided with a handle 25, by which it is manipulated. Near the lower end of each lever is an offset depending strap 26, that closes and slides on a segmental guide-bar 27, and each lever bears a latch 28, Fig. 11, arranged to enter a notch 29 in the guide-bar 27. The lock-lever box is of heavy metallic plate and is provided with a door by which the levers in the the interior are reached and a lock by which they are secured from reach of unauthorized persons.

The operation is as follows: Assuming the doors to be open, the levers 24 will then be perpendicular, the bolt-carrying bar 11 raised, and the toes 16 of the springs 15 pressed outward and under the bolt 12. As the door is closed, the spring 15 is pressed backward by the eyes 7, the bolt-carrying bar 11 falls, the bolts 12 enter the eyes 7, and the door is locked by means inaccessible from inside the cell or area, while simultaneously, by means of the rod 20, the lever 24 falls in the notch 29, thereby receiving the locking mechanism. If the person in the cell attempts to prevent the secure locking of the cell by inserting something between the door and jamb, this is at once detected at the bar 23, as the lever 24 will not swing until the bolts enter the eyes. The door is unlocked by releasing the latch 28 from the notch 29 and rocking the lever 24 down, which withdraws the bolts from the eyes when the spring 15 forces the door partially open.

We claim as our invention—

1. In a prison-locking apparatus, the hinged cell-door having bolt-eyes and a hollow jamb-post having openings to receive said eyes, and vertically-moving bolts within said jamb-post, arranged to enter said eyes, combined with springs located in said jamb-post, arranged to be engaged and pressed inward by said eyes and provided with toes to rest under and sustain the bolts as the eyes are withdrawn, substantially as shown and described.

2. In a prison-locking apparatus, the hinged cell-door having bolt-eyes and a hollow jamb-post having openings to receive said eyes, and vertically-moving bolts within said jamb-post, arranged to enter said eyes, and springs located in said post, arranged to be engaged and pressed inward by said eyes, combined with an adjusting device, as a cam, by which the tension of the spring may be regulated.

3. The combination, with the rock-shaft arranged to operate the locking-bolts and the hand-lever arranged to rock said shaft, of the automatic latch attached to said hand-lever, and the notched segmental guide-bar arranged to be engaged by said latch, substantially as shown and described.

In testimony that we claim the above we hereunto set our hands.

FRANK O. WEARY.
GEORGE W. KRAMER.

In presence of—
C. E. HUMPHREY,
C. P. HUMPHREY.